C. C. FAIRLAMB.
Milk-Pan.
No. 215,812. Patented May 27, 1879.
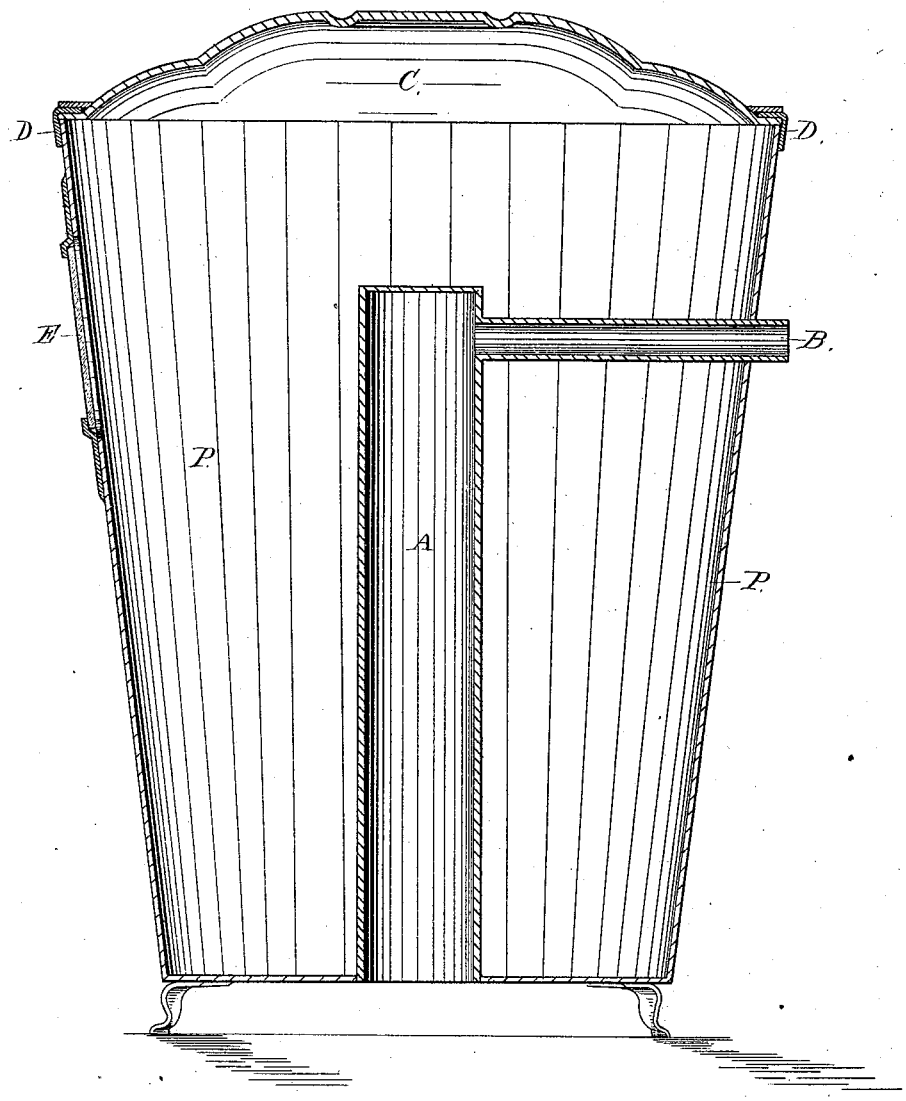
Attest:
G. T. Smallwood
Walter Allen
Inventor:
Charles C. Fairlamb
By Knight Bros
attys.

UNITED STATES PATENT OFFICE.

CHARLES C. FAIRLAMB, OF MAZO MANIE, WISCONSIN.

IMPROVEMENT IN MILK-PANS.

Specification forming part of Letters Patent No. 215,812, dated May 27, 1879; application filed November 4, 1878.

*To all whom it may concern:*

Be it known that I, CHARLES C. FAIRLAMB, of Mazo Manie, in the county of Dane and State of Wisconsin, have invented a new and useful Improvement in Milk-Pans, of which the following is a specification.

My invention relates to pans for setting milk for cream; and it consists in an appliance for keeping cool the central portion of the milk in a deep covered pan without interfering with the application and removal of the cover. To this end I provide the pan with an air or water duct rising from the center of its bottom, and communicating with a horizontal pipe, which extends out through the side of the pan near the top. I also prefer to cover my improved pan with a lid packed with rubber, as described in my Patent No. 208,900, dated the 15th of October, 1878.

In order that my invention may be fully understood, I will proceed to describe it with reference to the accompanying drawing, which represents a vertical section of my improved pan with cover applied.

P represents a deep pan of ordinary external form, and A a vertical tube, open below through the center of the bottom, and rising within the pan nearly to its top, where it communicates with a horizontal pipe, B, extending out through the side. C is a cover, which may be of ordinary form, but is preferably provided with a rubber band, D, for making it air-tight, as described in my Patent No. 208,900, before referred to. E represents a glass or other transparent pane, which is graduated so as to gage the depth of the cream and admit of selling it by the inch or fraction thereof.

My improved can is intended to be used in either air or water. The circulation of air or water, as the case may be, through the connected tubes A B will reduce the temperature of the center of the milk to about the same degree as the outside.

It is well known that the setting of milk in deep pans is most favorable for the elevation of cream; but great difficulty has been experienced from the "rotting" or deterioration of the central parts of the milk by reason of its retaining too high a temperature. Various expedients have been devised in order to effect the cooling of the central portions of the milk in deep pans as rapidly as the outside. Some of these interfere with the tight covering of the pans, which is a matter of great importance. Others have complications in their construction or attachments which render them unacceptable for ordinary domestic use.

My improvement is believed to possess the following advantages:

First, my improved pans are adapted for use in the same way as ordinary pans without difficulty or complication, and at the same time possess the important advantages of more costly and complicated contrivances in keeping the interior and exterior portions of the milk at a substantially uniform low temperature.

Second, without adding to the complication or difficulty of using the pans, it admits of setting milk in large bulk of from fifteen to ninety pounds in each pan, according to circumstances. Great saving in labor and cost of utensils is thus effected.

Third, the pan may be set in the open air or in water, as preferred, in order to derive the beneficial cooling effect of the air or water, while the milk is kept completely from contact of the air by means of my improved cover, which thus performs a highly important function in combination with my cooling-tubes.

Fourth, my improved pan, while it is well adapted for use in spring-houses, or in other places where running water exists, is available also in the open air, and thus extends greatly the utility or availability of deep setting-pans, which have heretofore been supposed to require running water, or forced circulation, or some artificial cooling appliance, for their successful use.

I find by experience that the cream taken from milk set in my improved pans will keep sweet longer than cream taken from pans having no such provision for keeping the center cool. The difference is caused by the cream being free from "center-rot." In the manufacture of butter by either factory or dairy this is a matter of great importance.

I also find that cream can be effectively raised in my improved pans at 20° Fahrenheit, which is a temperature much below that which has heretofore been thought necessary for the thorough separation of cream. My improved pans are therefore well adapted for extremes of heat and cold.

The cause of the improved pans operating at so low a temperature is not fully understood; but as electricity is known to play an important part in the raising of cream, and it is found that milk set in my improved pans does not suffer the usual injurious effect of thunder-storms, it is believed that the results stated may be produced in part by the conducting metallic circuit afforded by the central and lateral pipes and the side and bottom of the pan.

Having thus described my invention, the following is what I claim as new therein and desire to secure by Letters Patent—

1. A deep milk-pan provided with a central vertical tube, A, open at bottom, and communicating with a horizontal pipe, B, extending through the side of the pan near the top, substantially as and for the purposes set forth.

2. The pan P, provided with a circulating-pipe, A B, opening through the bottom and side, and having a cover, C, provided with an elastic band, D, to make it air-tight, as explained.

C. C. FAIRLAMB.

Witnesses:
D. N. SMITH,
E. C. MOULTON.